United States Patent
Kuo et al.

(10) Patent No.: US 7,613,565 B2
(45) Date of Patent: Nov. 3, 2009

(54) VOICE NAVIGATION DEVICE AND VOICE NAVIGATION METHOD

(75) Inventors: Ming-Jen Kuo, Taipei (TW); Wan-Lin Cheng, Fonglin Township, Hualien County (TW)

(73) Assignee: Mitac International Corp., Taoyuan (TW)

( * ) Notice: Subject to any disclaimer, the term of this patent is extended or adjusted under 35 U.S.C. 154(b) by 546 days.

(21) Appl. No.: 11/242,929

(22) Filed: Oct. 5, 2005

(65) Prior Publication Data
US 2006/0155468 A1   Jul. 13, 2006

(30) Foreign Application Priority Data
Jan. 7, 2005   (TW) ............................... 94100494 A (51) Int. Cl.
*G01C 21/00*   (2006.01)
*G08G 1/0962*  (2006.01)

(52) U.S. Cl. ..................................................... 701/211

(58) Field of Classification Search ....................... None
See application file for complete search history.

(56) References Cited

U.S. PATENT DOCUMENTS

| 5,809,447 | A  | * | 9/1998  | Kato et al. ................... 701/211 |
| 6,208,932 | B1 | * | 3/2001  | Ohmura et al. ............. 701/200 |
| 6,266,614 | B1 | * | 7/2001  | Alumbaugh ................. 701/211 |
| 6,957,128 | B1 | * | 10/2005 | Ito et al. ......................... 701/1 |
| 2005/0143915 | A1 | * | 6/2005 | Odagawa et al. ............. 701/211 |
| 2007/0093958 | A1 | * | 4/2007 | Jonsson et al. ............... 701/211 |

* cited by examiner

*Primary Examiner*—Michael J. Zanelli
(74) *Attorney, Agent, or Firm*—Rabin & Berdo, P.C.

(57) ABSTRACT

The voice navigation method relates to a voice navigation device and a voice navigation method, which may be utilized in cooperation with the Satellite Global Positioning System. The method is used to broadcast a voice-guidance-item having higher requirement importance more preferentially than a voice-guidance-item having low requirement importance, even if the voice-guidance-item having low requirement importance is obtained when the voice-guidance-item having high requirement importance is still in progress.

8 Claims, 6 Drawing Sheets

FIG. 1

| Voice-guidance-item group 1211 | Voice-guidance-item priority weight | |
|---|---|---|
| | Priority weight 1212 | Voice-guidance-item 1213 |
| 1 | 3 | Welcome to the voice navigation system |
| 1 | 3 | Enter the super highway at front crossroad |
| 1 | 3 | Exit the super highway at front crossroad |
| 1 | 3 | Keep to the right and enter the super highway at front crossroad |
| 1 | 3 | Keep to the left and enter the super highway at front crossroad |
| 1 | 3 | Enter the high speed road at front crossroad |
| 1 | 3 | Exit the high speed road at front crossroad |
| 1 | 3 | Turn to left at front crossroad |
| 1 | 3 | Turn to right at front crossroad |

VOICE NAVIGATION DEVICE AND VOICE NAVIGATION METHOD

BACKGROUND OF THE INVENTION

1. Field of the Invention

The invention relates to a voice navigation device and voice navigation method utilized in the voice navigation of vehicles.

2. Related Art

The Satellite Global Positioning System (SGPS) is a system researched and developed by US Defense Department in the 1970s, comprising altogether 28 satellites. The major principle of its application lies in making use of the time required for the radio wave emitted by a satellite to reach a receiver at a ground station in order to calculate the distance between them, meanwhile utilizing the satellite to calculate the longitude, latitude, and the elevation of the receiver at the ground station.

The original purpose of the development of the satellite global positioning system is for military application, however, recently it has been gradually released to the civilian sectors for positioning application. In the past, for defense and security reasons, the US Defense Department has for a long time utilized the establishment of the scrambling codes to purposely reduce the accuracy of the non-military application of the SGPS. As such, the errors of civilian versions of the satellite SGPS system are around 100 meters. Under this circumstance, it is not capable of fulfilling the requirement of monitoring and navigating an ordinary vehicle. Therefore, a certain auxiliary system must be supplemented, so as to increase its positioning accuracy.

In recent years, due to the widespread usage of the civilian and commercial satellite global positioning system, the calls and demands for the US Defense Department to cancel the scrambling and interference of the civilian sector of the SGPS had been ever increasing, and on May 1, 2000 the US government finally agreed and lifted such restrictions on the civilian sector of the SGPS. As such, the error of the SGPS can be reduced to around 10 meters at best, thus significantly increasing the accuracy of the SGPS for civilian application.

The satellite global positioning system for civilian and commercial application can be utilized in: a police car dispatching system, a vehicle navigation system, a passenger transport management system, a taxi dispatching system, a train control and warning system, a cargo transport management system, etc. Nowadays, a vehicle navigation system is very popular in domestic automobile industry, which is used in cooperation/combination with electronic maps, so that the driver in the vehicle is aware of his present position, and is also able to obtain the information about the surrounding environment.

When the Satellite Global Positioning System is used in a vehicle for navigation, the voice navigation device may be utilized to provide convenient direction and reference for the driver through voice broadcasting. However, the problem with the ordinary voice navigation device is that the on-going voice-guidance-item is apt to be interrupted by a new voice-guidance-item, and this will happen even when the on-going voice-guidance-item is of greater importance than the new one. As such, the driving safety may be in jeopardy.

SUMMARY OF THE INVENTION

In view of the above-mentioned problems and shortcomings of the prior art, the object of the invention is to provide a voice navigation device and a voice navigation method, through which the on-going voice-guidance-item of greater importance or higher priority weight will not be interrupted by those of lesser importance or lower priority weight, so that the voice-guidance-item of greater importance or higher priority weight can be broadcasted preferentially.

As such, to achieve the above-mentioned object, the voice navigation device and the voice navigation method of the invention are utilized in cooperation with a Satellite Global Positioning System, comprising: a receiver, a voice-guidance-item priority weight data base, a voice-guidance-item broadcasting unit, and a processor.

In the above-mentioned configuration, the receiver is connected to the Satellite Global Positioning System, thus obtaining more than one road-condition message. The voice-guidance-item priority weight data base is used to store the voice-guidance-item priority weight table, which includes at least two groups of voice-guidance-items, having different priority weights respectively, with each voice-guidance-item group including more than one voice-guidance-item, and each voice-guidance-item corresponds to a road condition message.

Furthermore, the voice-guidance-item broadcasting unit is used to obtain the voice-guidance-item for broadcasting. The processor is used to connect the receiver, the voice-guidance-item priority weight data base, and the voice-guidance-item broadcasting unit, so that when the road condition message is received from the receiver, it is used to obtain the corresponding voice-guidance-item from the voice-guidance-item priority weight data base, and furnished to the voice-guidance-item broadcasting unit to broadcast. When another road condition message is received while the original broadcast is still in progress, which is used to obtain another corresponding voice-guidance-item from the voice-guidance-item priority weight data base, the priority weight of the original voice-guidance-item is evaluated and compared with that of the other voice-guidance-item. These two items are classified into the voice-guidance-item having high priority weight and the voice-guidance-item having low priority weight, and the voice-guidance-item having high priority weight is broadcasted until it has finished, then the voice-guidance-item having low priority weight is broadcasted.

Therefore, the voice navigation device and the voice navigation method disclosed by the invention can be utilized such that when the importance of the on-going broadcasting voice-guidance-item is greater than that of the newly-obtained voice-guidance-item, the on-going broadcasting voice-guidance-item will not be interrupted by the newly obtained voice-guidance-item, as such the voice-guidance-item of greater importance can be broadcasted preferentially. Thus the invention is quite different from the prior art, and the driving safety will not be put into jeopardy.

The voice navigation method disclosed by the invention can be utilized in cooperation with the Satellite Global Positioning System, comprising the following steps: firstly, receiving the road condition message. Then, obtaining the voice-guidance-item corresponding to the road condition message. Afterwards, broadcasting the voice-guidance-item; then, receiving another road condition message while the on-going voice-guidance-item broadcasting is still in progress; subsequently obtaining another voice-guidance-item corresponding to the mentioned other road condition message; then evaluating and comparing the priority rights of the original voice-guidance-item and the newly obtained voice-guidance-item. Finally, if it is determined that the priority weight of the original voice-guidance-item is higher than that of the newly obtained voice-guidance-item, the newly-obtained voice-guidance-item will only be broadcasted after the original voice-guidance-item has finished broadcasting.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow, which is for illustration only and thus is not limitative of the present invention, wherein.

DETAILED DESCRIPTION OF THE INVENTION

The purpose, construction, features, and functions of the invention can be appreciated and understood further through the following detailed description with reference to the attached drawings.

Figure 1:
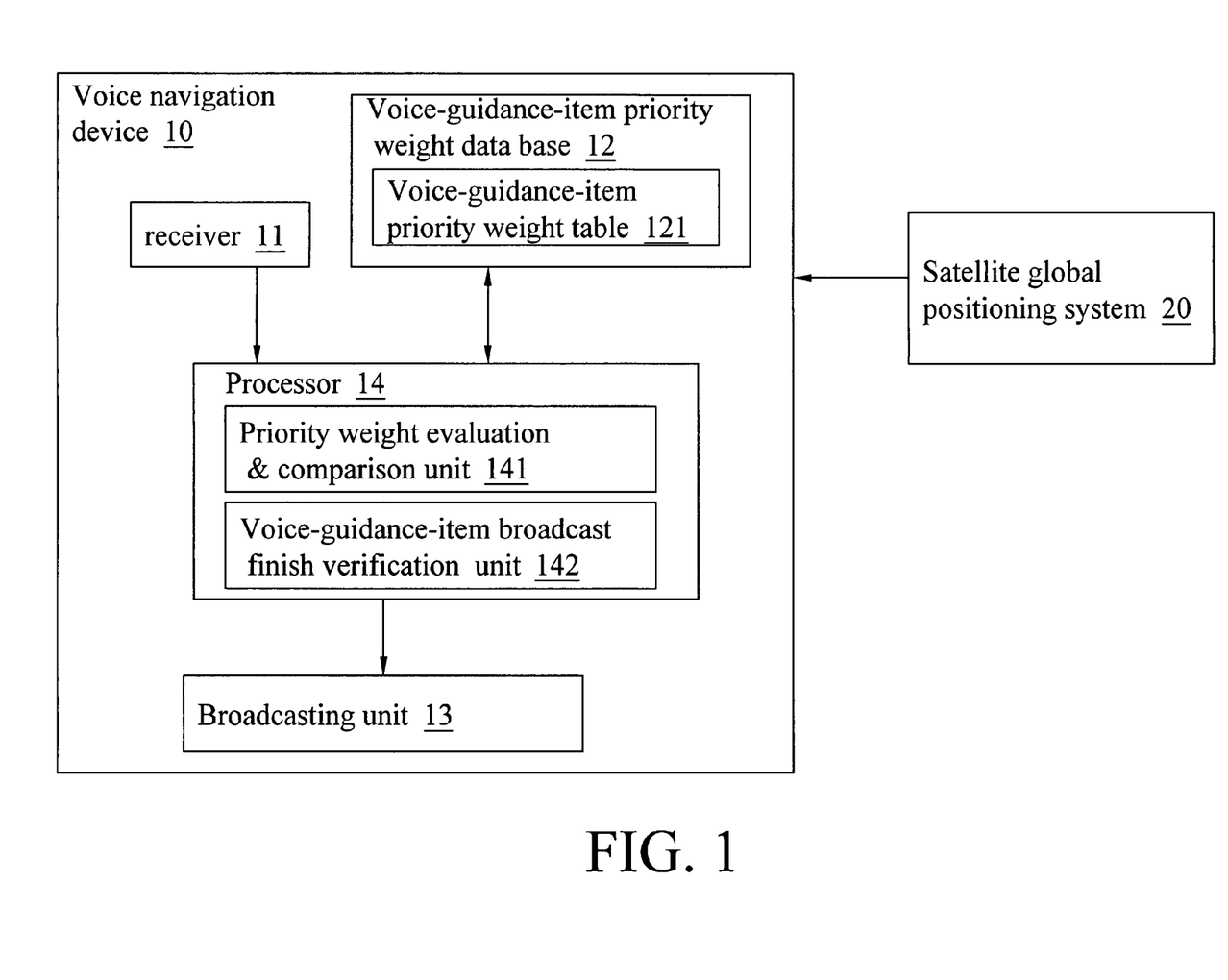
FIG. 1 is a schematic diagram of the voice navigation device according to the embodiment of the invention.

The invention relates to a voice navigation device and navigation method. Refer to FIG. 1 for the schematic diagram of the device of the invention, and to FIGS. 2A to 2C for the voice-guidance-item priority weight table. The voice navigation device 10 of the invention is used in cooperation with a satellite global positioning system 20, comprising a receiver 11, a voice-guidance-item priority weight data base 12, a voice-guidance-item broadcasting unit 13 and a processor 14.

Figure 2A:
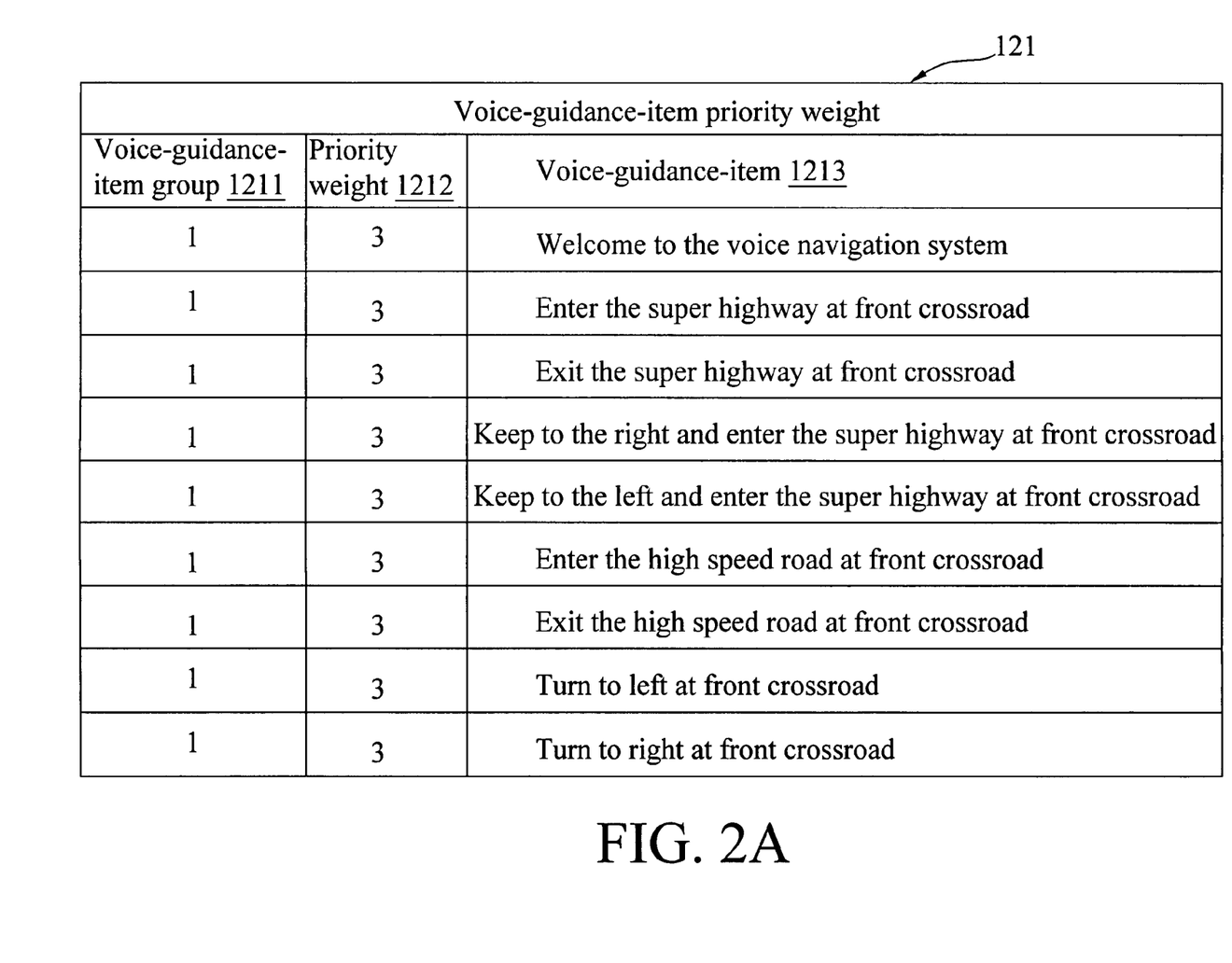
FIGS. 2A to 2C are the schematic diagrams of the voice-guidance-item priority weight table according to the embodiment of the invention.
Figure 2B:
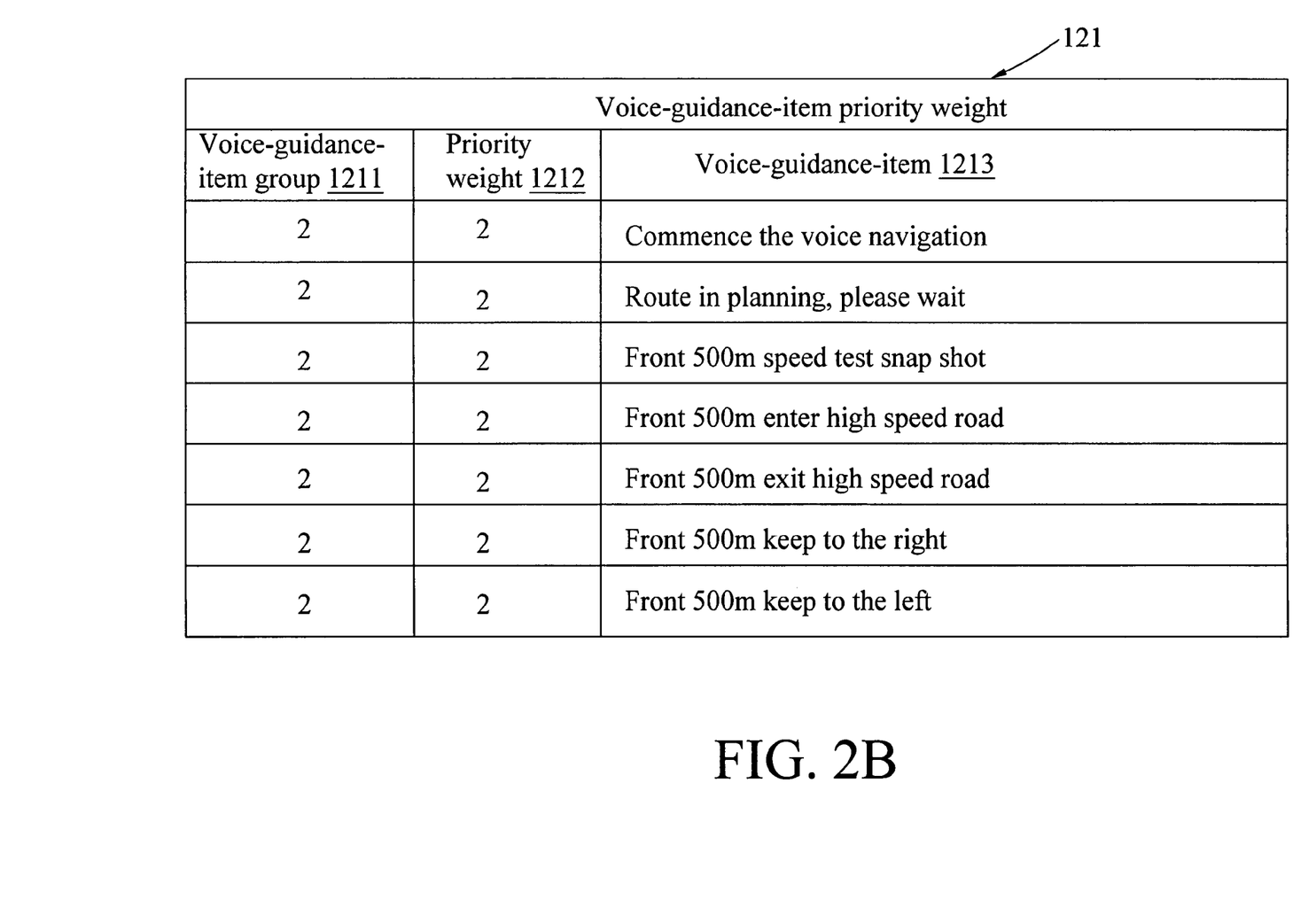
Figure 2C:
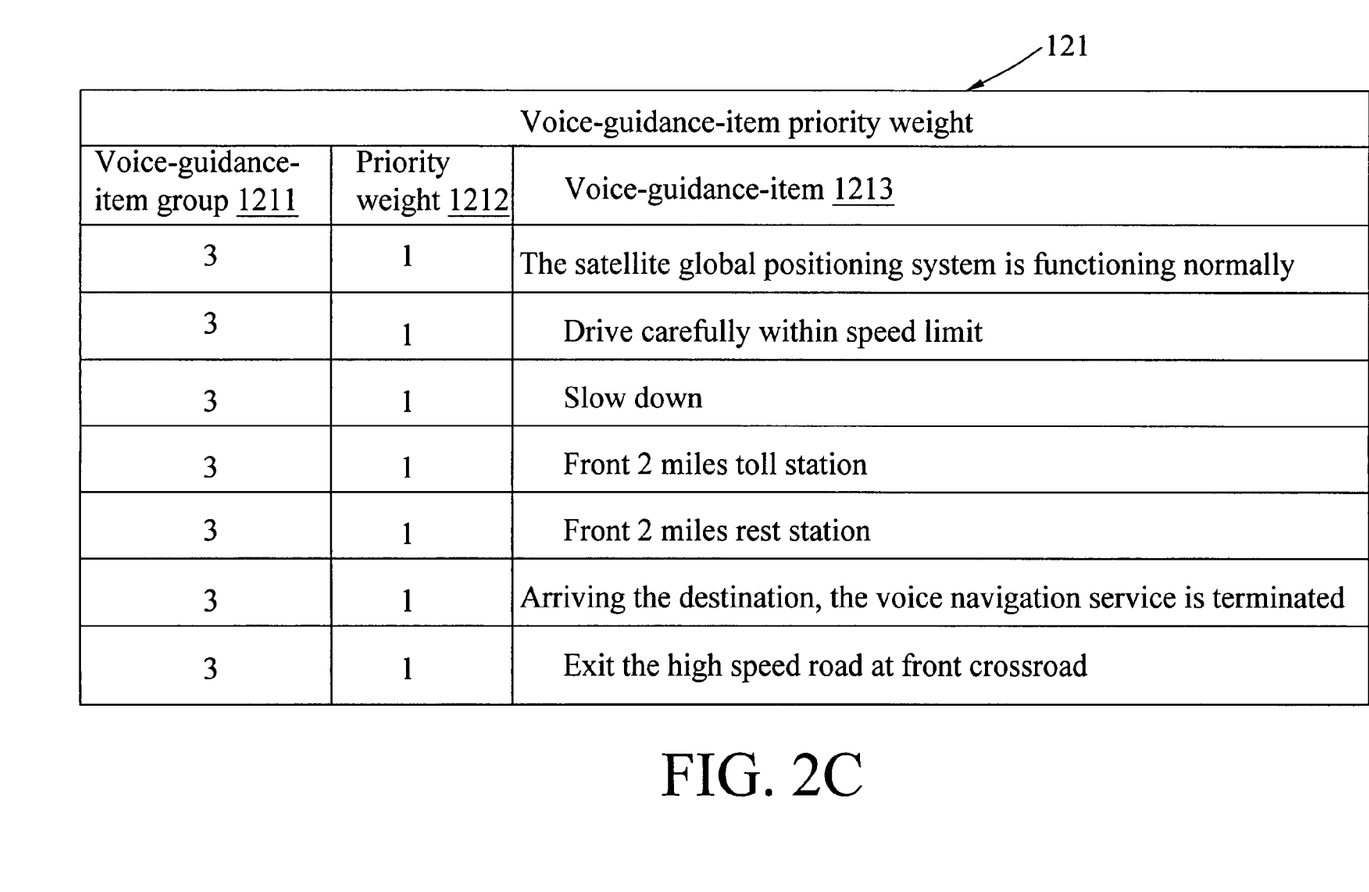

In the above-mentioned configuration, the receiver 11 is connected to the satellite global positioning system 20, and is used to obtain more than one road-condition message (not shown). The voice-guidance-item priority weight data base 12 is used to store the voice-guidance-item priority weight 121, comprising at least two voice-guidance-item groups 1211 (three groups as shown in FIGS. 2A to 2C) having different priority weights 1212 (classified according to the importance of driving requirements) respectively, with each voice-guidance-item group 1211 having more than one voice-guidance-item 1213, which corresponds to the respective road condition message. The voice-guidance-item broadcasting unit 13 is used to obtain the voice-guidance-item 1213 for broadcasting.

In addition, the processor 14 is connected to the receiver 11, the voice-guidance-item priority weight data base 12, and the voice-guidance-item broadcasting unit 13, comprising a priority weight evaluation & comparison unit 141 and a broadcast finish verification unit 142, wherein the priority weight evaluation & comparison unit 141 is used to evaluate and compare the priority weight of the voice-guidance-item 1213 and another voice-guidance-item 1213, while the broadcast finish verification unit 142 is used to verify whether the broadcasting of the voice-guidance-item 1213 has finished.

As mentioned earlier, in the application of the invention, when the road condition message is received at the receiver 11, the processor 14 is used to obtain the corresponding voice-guidance-item 1213 from the voice-guidance-item priority weight data base 12, which is provided to the voice-guidance-item broadcasting unit 13 to broadcast; and if another road condition message is received while the broadcasting of the original voice-guidance-item 1213 is still in progress, then the other corresponding voice-guidance-item 1213 is obtained from the voice-guidance-item priority weight data base 12, and the priority weight of the original voice-guidance-item 1213 and that of the newly obtained voice-guidance-item 1213 are evaluated and compared. These two items are classified as the voice-guidance-item 1213 having high priority weight and the voice-guidance-item 1213 having low priority weight. The voice-guidance-item having high priority weight is first broadcasted until it has finished, then the voice-guidance-item having low priority weight is broadcasted. Naturally, if another road condition message is received while the original broadcast is still in progress, the above-mentioned process will be repeated.

Figure 3A:
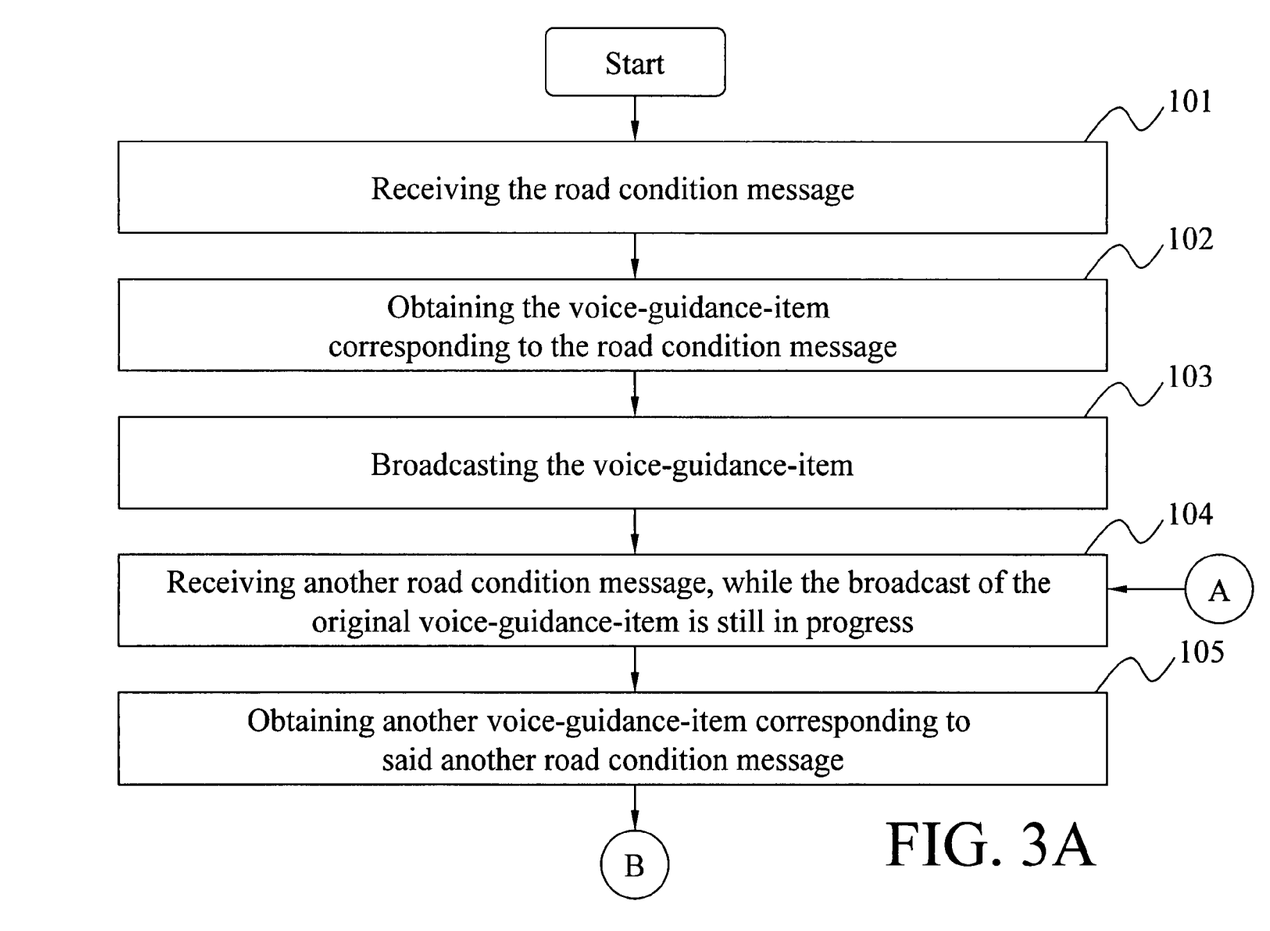
FIGS. 3A to 3B is a flowchart of the steps of the navigation method according to the embodiment of the invention.
Figure 3B:
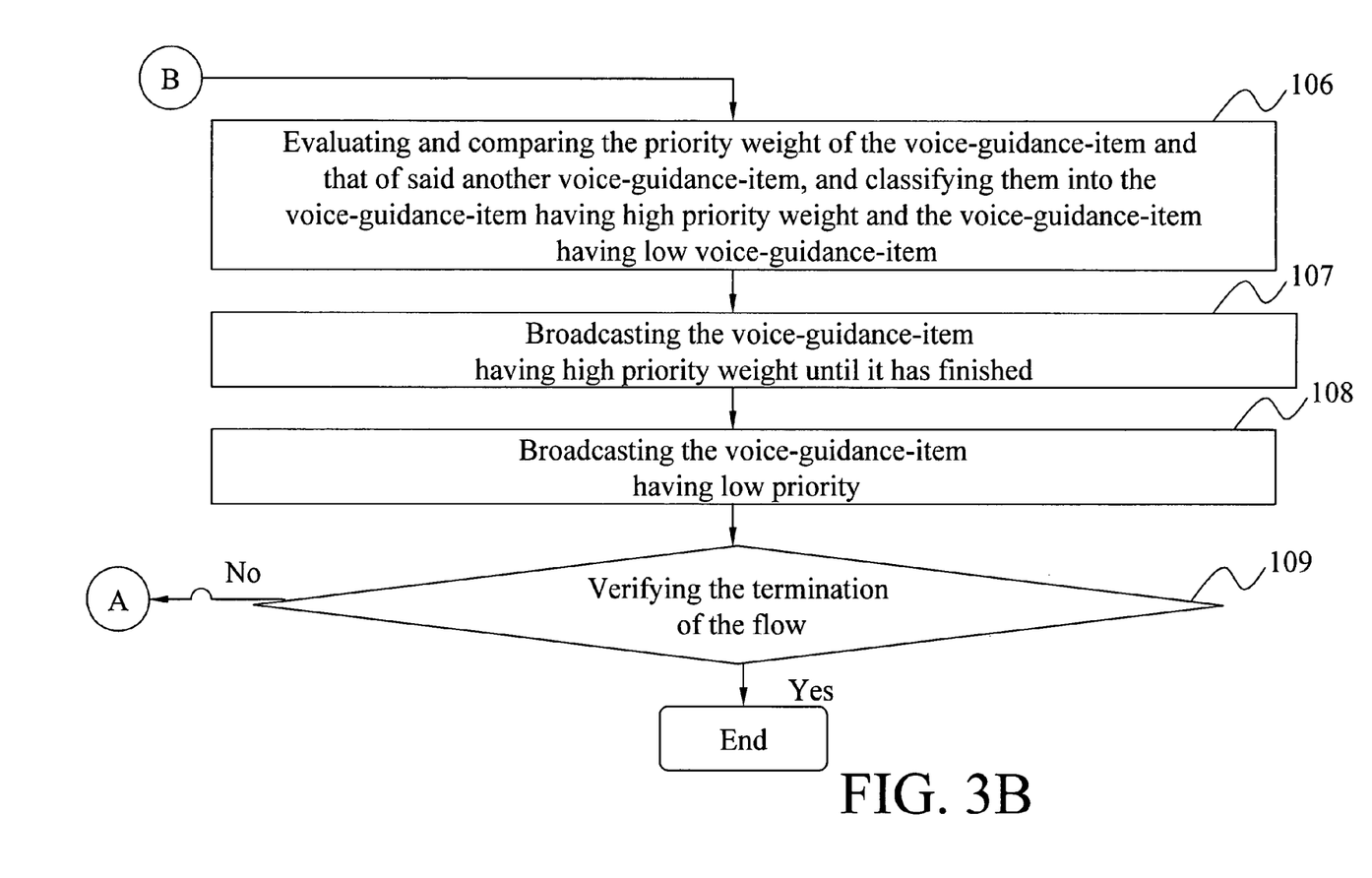

Next, refer to FIG. 3A to 3B for the flowchart of the steps of the voice navigation method according to the embodiment of the invention, which is utilized in cooperation with the Satellite Global Positioning System, comprising the following steps: receiving the road condition message (step 101); obtaining voice-guidance-item corresponding to the road condition message (step 102), which is stored in a group of voice-guidance-items; broadcasting a voice-guidance-item (step 103); receiving another road condition message while the broadcasting of the original voice-guidance-item is still in progress (step 104); obtaining another voice-guidance-item corresponding to mentioned other road condition message (step 105), which is stored in another group of voice-guidance-items; evaluating and comparing the priority weight of the original voice-guidance-item and that of the newly obtained other voice-guidance-item, and classifying them into the voice-guidance-item having high priority weight and the voice-guidance-item having low priority weight (step 106) (please refer to FIGS. 2A to 2C for the schematic diagram of the voice-guidance-item priority weight table of the invention); broadcasting the voice-guidance-item having high priority weight until it has finished (step 107), then broadcasting the voice-guidance-item having low priority weight (step 108). Finally, verifying the termination of the process flow (step 109), namely, verifying whether the voice navigation device is 'power down'. If the answer is affirmative, then the process flow has indeed finished, otherwise repeating the above steps 104 to 109.

Therefore, the voice navigation device and the voice navigation method disclosed by the invention can be utilized such that when the importance of the on-going broadcasting voice-guidance-item is greater than that of the newly-obtained voice-guidance-item, the on-going broadcasting voice-guidance-item will not be interrupted by the newly obtained voice-guidance-item. As such, the voice-guidance-item of greater importance can be broadcasted preferentially. Thus the invention is quite different from the prior art, and the driving safety will not be put into jeopardy.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A voice navigation device, comprising:
a receiver, receiving more than one traffic condition message;

a voice-guidance-item priority weight data base, which is used to store a voice-guidance-item priority weight table including at least two groups of voice-guidance-item each having different priority weight, with each said voice-guidance-item group including more than one voice-guidance-item, said voice-guidance-item corresponds to said traffic condition message;

a voice-guidance-item broadcasting unit, which is used to obtain said voice-guidance-item to broadcast; and a processor connected to the receiver, the voice-guidance-item priority weight data base, and the voice-guidance-item broadcasting unit, so that when said traffic condition message is received at said receiver, said processor is used to obtain the corresponding voice-guidance-item from the voice-guidance-item priority weight data base, which is provided to the voice-guidance-item broadcasting unit to broadcast; and if another traffic condition message is received while the broadcasting of the original voice-guidance-item is still in progress, then another corresponding voice-guidance-item is obtained from said voice-guidance-item priority weight data base, and the priority weight of the original voice-guidance-item and that of the newly obtained voice-guidance-item are evaluated and compared, after the broadcasting of the voice-guidance-item having higher priority weight has finished, then the voice-guidance-item having lower priority weight is broadcasted.

2. The voice navigation device of claim 1, wherein the priority weight is classified according to the importance of driving requirements.

3. The voice navigation device of claim 1, wherein the processor further comprising:

a priority weight evaluation and comparison unit, which is used to evaluate and compare the priority weight of the original voice-guidance-item and that of the newly obtained said another voice-guidance-item.

4. The voice navigation device of claim 1, wherein the processor further comprising:

a broadcast finish verification unit, which is used to verify the termination of the broadcast of the voice-guidance-item.

5. The voice navigation device of claim 1, wherein, if said voice-guidance-item broadcasting unit has not finished broadcasting and another traffic condition message from the receiver is received by said processor, a corresponding voice-guidance-item of the another traffic condition message is obtained from said voice-guidance-item priority weight data base, the priority weight of the original voice-guidance-item and that of another voice-guidance-item are evaluated and compared, and, after the broadcasting of the voice-guidance-item having high priority weight has finished, the voice-guidance-item having lower priority weight is broadcasted.

6. A voice navigation method, comprising the following steps:

(A) receiving a traffic condition message;
(B) obtaining a voice-guidance-item corresponding to said traffic condition message;
(C) broadcasting said voice-guidance-item;
(D) receiving another traffic condition message while the broadcast of said voice-guidance-item is still in progress;
(E) obtaining another voice-guidance-item corresponding to said another traffic condition message;
(F) evaluating and comparing the priority weight of said voice-guidance-item and that of said another voice-guidance-item, classifying them into the voice-guidance-item having high priority weight and the voice-guidance-item having low priority weight;
(G) broadcasting the voice-guidance-item having high priority weight until it has finished; and
(H) broadcasting the voice-guidance-item having low priority weight.

7. The voice navigation method of claim 6, wherein said voice-guidance-item and said another voice-guidance-item are stored in different groups of voice-guidance-items respectively.

8. The voice navigation method of claim 6, further comprising a step of verifying the termination of the step (H), and if the result of the verification is negative, then steps (D) to (H) are repeated.

* * * * *

UNITED STATES PATENT AND TRADEMARK OFFICE
CERTIFICATE OF CORRECTION

PATENT NO. : 7,613,565 B2  Page 1 of 1
APPLICATION NO. : 11/242929
DATED : November 3, 2009
INVENTOR(S) : Kuo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Nineteenth Day of October, 2010

David J. Kappos
*Director of the United States Patent and Trademark Office*